Figure 6:
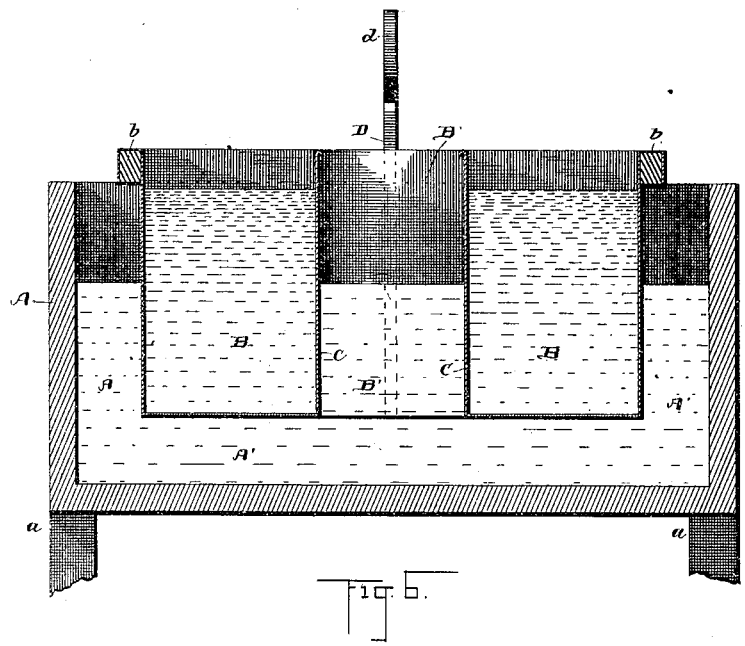

(No Model.) 2 Sheets—Sheet 1.
J. WILHELM.
CREAM TEMPERING VAT.
No. 351,012. Patented Oct. 19, 1886.
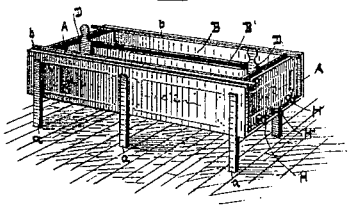
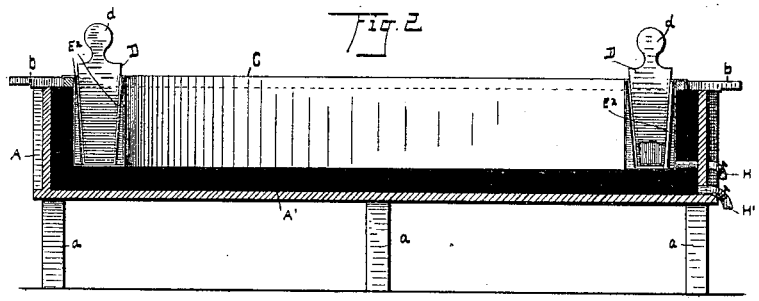
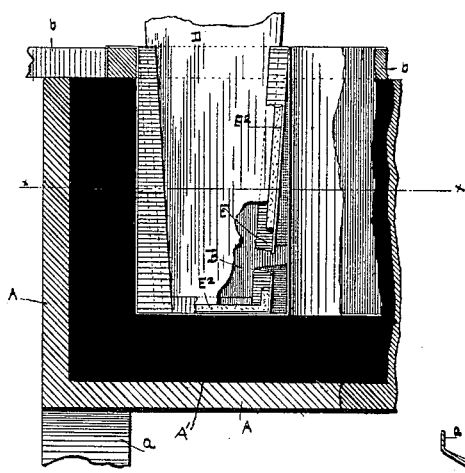
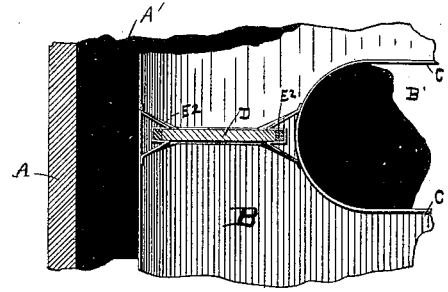
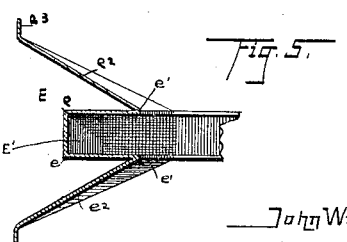
WITNESSES
N. S. Amstutz
Geo. W. King
John Wilhelm INVENTOR
By
Leggett & Leggett Attorneys (No Model.) 2 Sheets—Sheet 2.

J. WILHELM.
CREAM TEMPERING VAT.

No. 351,012. Patented Oct. 19, 1886.

WITNESSES
O. S. Amstutz
Geo. W. King

John Wilhelm, INVENTOR
By Liggett & Liggett
Attorneys

UNITED STATES PATENT OFFICE.

JOHN WILHELM, OF WOOSTER, OHIO.

CREAM-TEMPERING VAT.

SPECIFICATION forming part of Letters Patent No. 351,012, dated October 19, 1886.

Application filed March 17, 1886. Serial No. 195,545. (No model.)

*To all whom it may concern:*

Be it known that I, JOHN WILHELM, of Wooster, in the county of Wayne and State of Ohio, have invented certain new and useful Improvements in Cream-Tempering Vats; and I do hereby declare the following to be a full, clear, and exact description of the invention, such as will enable others skilled in the art to which it pertains to make and use the same.

My invention relates to improvements in cream-tempering vats; and it consists in certain features of construction and in combination of parts hereinafter described, and pointed out in the claims.

In the accompanying drawings, Figure 1 is a view in perspective of a vat embodying my invention. Fig. 2 is an elevation in longitudinal section through the center of the vat. Fig. 3 is an enlarged view of the left-hand portion of Fig. 2, portions being broken away to show the construction. Fig. 4 is a horizontal section on the line of $xx$, Fig. 3. Fig. 5 is an enlarged view of the left-hand guide shown in Fig. 4, being taken on the same section-line as Fig. 4; and Fig. 6 is a view in transverse vertical section through the center of the vat.

A represents the water-tank or outside casing, that is usually made of wood and mounted on suitable legs, $a$.

B is the vat in which the cream or milk is placed. This vat is of thin sheet metal, usually of tin, and is suspended on cross-bars $b$, the latter being usually of wood and resting on the edges of the tank A. The water-space A' is thus left between the vat and tank, so that the bottom and sides of the vat B are in contact with the hot or cold water, whichever may be used in the tank A. Thus far the device may be of the ordinary construction, such as is well known and in general use.

The cream or milk next the bottom and sides of the vat B is quickly cooled; but with larger vats the contents at the center are a long time in cooling. I have therefore devised a well or water-space, B', through the center portion of the vat B, the said well or water-space being in open relation with the water-space between the bottom of the tank and vat.

The construction is as follows: The walls C of the well are vertical, and are joined to the bottom of the vat B around a central opening, the latter being usually about six inches wide, and extending nearly the length of the vat B. The walls C are joined together at the ends on curved lines, as shown more clearly in Fig. 4. Between the walls C and the end walls of the vat B are located gates D, by closing which the vat B is divided into two compartments, that may be used independent of each other—as, for instance, when two batches of milk are to be kept separate. By removing or opening the gates the two compartments are in open relation with each other and practically the same as one vat. The gate itself is usually a piece of board made slightly tapering widthwise, the bottom end being the narrowest, and having a suitable handle, $d$, at the top. The ways E, in which the gates slide, are made of strips of tin bent at right angles at $e$ and doubled back at $e'$ to form legs $e^2$, and bent outward to form the feet $e^3$. These feet are soldered or joined to the walls of the vat. The spaces E', that receive the gates, are packed with cork, E², for the edges of the gates to abut against. The legs $e^2$ are left broad at the bottom, so that the opposite sides of the ways E converge as they extend downward to fit the taper of the gates. The ways and cork filling extend also along the bottom of the gateways, so that the gates engage only a cork abutment. Discharge-gates H lead from the two compartments of the cream-vat, and a gate, H', leads from the water-tank.

In operating the device by means of the water-space the central portion as well as the outer portion of the vat's contents is heated or cooled and by the same agency.

I am aware that it is not new to provide a milk-can with a centrally-located water-space, and also that it is old to provide a cream-vat with a central well or water-space in open communication with the water-space around the vat, and hence I make no claim, broadly, to such construction.

What I claim is—

1. In a cream-tempering apparatus, the combination, with a tank and a vat suspended therein and having a water-space in the body thereof in open relation with the water-space around the vat, of gates for dividing the interior of the vat into compartments, substantially as set forth.

2. In a cream-tempering vat, the combination, with a tank and a vat located therein, the latter having a centrally-located well in open communication with the water-space surrounding the vat, of gateways secured to the side of the vat and the side of the well, respectively, and gates for dividing the vat into compartments.

3. In a cream-tempering vat, the combination, with a water-tank and a vat located therein, the latter having a centrally-located well in open communication with the water-space surrounding the vat, of the gateways secured to the side of the well and side of the vat, respectively, each gateway having a cork filling, against which the gate rests, and gates for dividing the vat into compartments, substantially as set forth.

In testimony whereof I sign this specification, in the presence of two witnesses, this 3d day of March, 1886.

JOHN WILHELM.

Witnesses:
   CHAS. H. DORER,
   ALBERT E. LYNCH.